(12) United States Patent
Cortez et al.

(10) Patent No.: US 10,190,388 B2
(45) Date of Patent: Jan. 29, 2019

(54) DIVERTER FLUID DIVERTER FLUID

(71) Applicant: HALLIBURTON ENERGY SERVICES, INC., Houston, TX (US)

(72) Inventors: Janette Cortez, Porter, TX (US); Dipti Singh, Kingwood, TX (US); Ubong Inyang, Humble, TX (US); Bradley J. Sparks, Richmond, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/755,271

(22) PCT Filed: Oct. 15, 2015

(86) PCT No.: PCT/US2015/055769
§ 371 (c)(1),
(2) Date: Feb. 26, 2018

(87) PCT Pub. No.: WO2017/065778
PCT Pub. Date: Apr. 20, 2017

(65) Prior Publication Data
US 2018/0244977 A1    Aug. 30, 2018

(51) Int. Cl.
  *E21B 33/138*    (2006.01)
  *E21B 21/00*     (2006.01)
  *C09K 8/504*     (2006.01)
  *E21B 43/267*    (2006.01)

(52) U.S. Cl.
  CPC .......... *E21B 33/138* (2013.01); *C09K 8/5045* (2013.01); *E21B 21/003* (2013.01); *E21B 43/267* (2013.01); *C09K 2208/24* (2013.01); *C09K 2208/26* (2013.01)

(58) Field of Classification Search
  None
  See application file for complete search history.

(56) References Cited

U.S. PATENT DOCUMENTS

| 5,325,921 | A  | 7/1994  | Johnson et al. |
|-----------|----|---------|----------------|
| 5,353,874 | A  | 10/1994 | Manulik        |
| 5,826,669 | A  | 10/1998 | Zaleski et al. |
| 6,749,022 | B1 | 6/2004  | Fredd          |
| 7,482,311 | B2 | 1/2009  | Willberg et al.|
| 8,016,040 | B2 | 9/2011  | Ali et al.     |
| 8,096,353 | B2 | 1/2012  | Ver Meer       |
| 8,114,820 | B2 | 2/2012  | Crews et al.   |
| 8,173,581 | B2 | 5/2012  | Huang          |

(Continued)

FOREIGN PATENT DOCUMENTS

WO    2012048068 A2    4/2012

OTHER PUBLICATIONS

Paredes, J.I. et al.; "Graphene Oxide Dispersions in Organic Solvents,"; Lanmuir, vol. 24, No. 19, 2008; pp. 10560-10564.

(Continued)

*Primary Examiner* — Anuradha Ahuja
(74) *Attorney, Agent, or Firm* — Polsinelli PC (57) ABSTRACT

A diverter fluid having a carbon-containing particulate dispersed therein for controlling fluid flow within subterranean formations. The diverter fluid can be injected into a wellbore for formation of a filter cake by the carbon-containing particulate, and which disperses in hydrocarbons for return to the surface.

9 Claims, 6 Drawing Sheets

(56) References Cited

U.S. PATENT DOCUMENTS

| | | | |
|---|---|---|---|
| 8,343,896 B2 | 1/2013 | Eoff et al. | |
| 8,703,659 B2 | 4/2014 | Dalrymple et al. | |
| 8,936,086 B2 | 1/2015 | Liang et al. | |
| 2011/0059871 A1* | 3/2011 | Tour | B82Y 30/00 507/137 |
| 2011/0186789 A1 | 8/2011 | Samulski et al. | |
| 2012/0015852 A1* | 1/2012 | Quintero | C09K 8/032 507/112 |
| 2012/0181029 A1* | 7/2012 | Saini | C04B 40/0633 166/307 |
| 2012/0245058 A1* | 9/2012 | Monteiro | C09K 8/032 507/110 |
| 2014/0011034 A1 | 1/2014 | Majumder et al. | |
| 2015/0057196 A1* | 2/2015 | Debord | C09K 8/685 507/213 |
| 2015/0114646 A1* | 4/2015 | Price Hoelscher | E21B 33/138 166/302 |
| 2015/0368539 A1* | 12/2015 | Tour | G01V 3/24 340/854.3 |
| 2017/0015890 A1* | 1/2017 | De Stefano | E21B 21/003 |

OTHER PUBLICATIONS

Society of Petroleum Engineers, Acid Fracturing, Oct. 15, 2015, http://petrowiki.org/Acid_fracturing.

Chua, Chun Kiang et al.; "Chemical reduction of graphene oxide: a synthetic chemistry viewpoint,"; Chem. Soc. Rev., 2014, 43,291; The Royal Society of Chemistry 2014.

Kuila, Tapas et al.; "Chemical functionalization of graphene and its applications," Progress in Materials Science; Mar. 30, 2012.

Georgakilas, Vasilios et al.; "Functionalization of Graphene: Covalent and Non-Covalent Approaches, Derivatives and Applications,"; Chemical Reviews; Jan. 31, 2012.

Society of Petroleum Engineers;Hydraulic Fracturing;Oct. 15, 2015, http://petrowiki.org/Hydraulic_fracturing.

Well Stimulation; Wikipedia, the free encyclopedia; retrieved from https://en.wikipedia.org/wiki/Well_stimulation on Sep. 2, 2015.

International Search Report and Written Opinion; PCT Application No. PCT/US2015/055769; dated Nov. 14, 2016.

Niyogi, Sandip et al., Abstract of Solution Properties of Graphite and Graphene; J. Am. Chem. Soc. 2006, 128 (24), pp. 7720-7721; May 19, 2006.

* cited by examiner

DIVERTER FLUID DIVERTER FLUID

CROSS-REFERENCE TO RELATED APPLICATIONS

This application is a national stage entry of PCT/US2015/055769 filed Oct. 15, 2015, said application is expressly incorporated herein in its entirety.

FIELD

The present disclosure relates generally to fluid control in subterranean wellbores. In particular, the present disclosure relates to preparing and introducing a diverter fluid having a carbon-containing particulate into a subterranean formation.

BACKGROUND

Downhole fluid control is necessitated at various stages of oilfield production. Limiting or preventing loss of fluids provided downhole is desirable in order to increase efficiencies or prevent damage to the formation or environment. One manner of preventing fluid loss, also referred to as leak-off, involves the use of filter cakes which form a film like barrier. Various solids, gels, sealants, foams or other additives, such as fluid loss control agents, can be pumped downhole to form a filter cake on the formation face. The filter cake blocks pores and provides an impermeable layer to fluid thereby diverting fluid and preventing fluid loss. However, due to this blocking action, the filter cake can inhibit subsequent desirable hydrocarbon production. Accordingly the filter cake may thereafter be removed by providing further additives such as breakers or acids which can dissolve or disrupt the formed filter cake. Self-degrading filter cake material has also been employed, which subsequent to forming the filter cake downhole, over time degrades and returns to the surface.

Fluid loss control agents can be used during well stimulation processes. For example, during hydraulic fracturing, a filter cake forming material can be employed to prevent leak off and direct the flow of fracturing fluid to locations in the formation to cause primary fractures and/or microfractures and wormholes. The filter cake can then be removed or self-degraded for subsequent hydrocarbon production.

Such fluid control agents can be employed at various other phases of well production. For example, some formations in addition to hydrocarbon producing zones may also have water producing zones. Fluid control techniques and agents can be employed to limit the flow of water and improve the flow of hydrocarbons. Such operations can be referred to as conformance operations for example.

Such fluid control is desirable in a large number of operations and treatments including drilling, drill-in, completion, stimulation, sand control (for example gravel packing, frac-packing, and sand consolidation), diversion, scale control, water control, and others.

BRIEF DESCRIPTION OF THE DRAWINGS

Implementations of the present technology will now be described, by way of example only, with reference to the attached figures, wherein.

It should be understood that the various embodiments are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. The terms "comprising," "including" and "having" are used interchangeably in this disclosure. The terms "comprising," "including" and "having" mean to include, but are not necessarily limited to, the things so described.

The term "dispersion" or "suspension" is defined herein as a system in which a discontinuous particulate phase is distributed throughout a continuous phase of a different substance, whether by mechanical energy or intermolecular interaction. "Dispersion" and "suspension" herein can include colloids, or any substantially uniform heterogeneous mixture. "Water based" fluid is defined herein to include fluids having an aqueous continuous phase, and may include systems which are all water or partly water, such as an oil-in-water emulsion.

Disclosed herein is a carbon-containing particulate for use as a fluid loss control agent. The carbon-containing particulate may be included and introduced into a wellbore dispersed in a water based diverter fluid. The carbon-containing particulates can include allotropes of carbon in their pristine state, an oxidized state, or a partially or fully reduced form of the oxidized state. The carbon-containing particulate can be graphene, graphene oxide and/or reduced graphene oxide.

Any one of these states can be further functionalized with various functional groups to vary the physical and chemical properties. Carbon allotropes exhibit enormous surface areas per unit volume allowing for a large surface interaction with substrate surfaces, such as fractures, micofractures, wormholes, or fracture matrices in subterranean formations. The large surface area of carbon allotropes can serve as sites for bonding of functional groups which can influence crystallization, chain entanglement or cross-linking, and morphology, and thus can greatly modify the properties of substrate surfaces, including elastic modulus, Young's modulus, electrical conductivity, thermal conductivity, and other properties.

The disclosure herein provides for suspension and delivery of the carbon-containing particulates, and in particular, delivery and introduction of graphene and/or graphene oxide in a water based fluid into a wellbore and return to the surface via produced hydrocarbons from the wellbore. The carbon-containing particulates herein permit suspension in a water based fluid while also dispersing in hydrocarbons. The carbon-containing particulates can be modified to be hydrophilic for polar dispersibility in a water based fluid, or modified to be hydrophobic and non-dispersable, or lowly dispersable in a water based fluid. When hydrophobic, the carbon-containing particulate can be dispersed in a water based carrier fluid by inclusion of a gelling agent, or by sufficient and continuous perturbation of the carrier fluid. When hydrophilic, they can be stably suspended in a water based carrier fluid by their natural polar dispersibility and/or by perturbation and then later modified to have hydrophobic properties. Accordingly, the carbon-containing particulate facilitates preparation, mixing, storage and/or delivery of the diverter fluid downhole during various phases of well processes.

Further, the diverter fluid disclosed herein once introduced into a wellbore affects the surface character of the formation face. In particular, the carbon-containing particulates can agglomerate and form a filter cake on the formation face. For example, the hydrophobic carbon-containing particulate tends to settle out from the water based diverter fluid and form a filter cake. Accordingly, hydrophobic carbon-containing particulate can be suspended in the diverter fluid by a gelling agent, and then released by breaking the gel within the wellbore. Alternatively, the carbo-containing particulate can be hydrophilic and dispersed in water base fluid, and then subsequent injection into a wellbore modified to be hydrophobic, such that the carbon-containing particulate falls or settles out of the diverter fluid to form a filter cake. This provides an impermeable film like barrier between the formation face and water based fluid preventing the passage of the fluid. In particular, pores, crevices, fracture, wormholes or other apertures in the formation can become blocked preventing the flow of water or water based fluids. This barrier diverts and directs the flow of water based fluids to within desired zones thereby preventing unwanted flow of water, fluid loss, or leak off.

The carbon-containing particulate disclosed herein can be returned to the surface via hydrocarbons produced in the well. When the carbon-containing particulate have hydrophobic properties (either prior to injection downhole, or subsequent), it is readily dispersed in hydrocarbons. Accordingly, after having formed a filter cake on the formation face, upon the flow of hydrocarbon and contact with the filter cake, the carbon-containing particulate disperses in the hydrocarbon. The carbon-containing particulate can then return to the surface with the hydrocarbon as it is produced. The carbon-containing particulate filter cake can effectively disperse in the hydrocarbon or be sufficiently weakened that it flows back into the hydrocarbon for return to the surface.

In particular, as disclosed herein, in order for generally hydrophilic properties and for dispersion in a water based fluid, an oxygen functionalized carbon-containing particulate can be employed, such as graphene oxide. Such oxygen functionalized carbon-containing particulate facilitates delivery into the wellbore due to its natural dispersion tendencies in water. For hydrophobic properties, for settling out of a water based fluid, and for dispersion in produced hydrocarbons for return to the surface, oxygen functionalized carbon-containing particulate can be reduced, which a may be for example reduced graphene oxide. The graphene oxide can be reduced downhole or reduced graphene oxide can be suspended in a water based fluid prior to injection into the wellbore by a gelling agent. Graphene can similarly be suspended in a gelling agent and introduced into the wellbore.

The various states of graphene, including graphene oxide and reduced graphene oxide can be variously employed to facilitate introduction into the wellbore as well as its use downhole. For example, reduced graphene oxide is insoluble in water and so may be suspended with a gelling agent in the diverter fluid and injected downhole. Once downhole, the gelling agent can be broken or degraded allowing for the reduced graphene oxide to settle out from the water based diverter fluid and form a filter cake on the formation face. With flow of hydrocarbon, the reduced graphene oxide will migrate and/or disperse in the hydrocarbon and return to the surface. Alternatively or additionally, graphene oxide exhibits polar dispersity in water and thus can be dispersed in a water based diverter fluid. This property of graphene oxide facilitates storage and pumping. During or subsequent to injection, the graphene oxide can be reduced by the addition or injection of reducing agents provided downhole. The graphene oxide, in the presence of reducing agents, will convert to reduced graphene oxide, and therefore displaying hydrophobicity, can then settle or fall out of the water based diverter fluid and form a filter cake downhole.

The diverter fluids disclosed herein can be employed during any of the phases of well production and operations to block or resist undesirable fluid flow. The diverter fluids can be employed in hydraulic fracturing applications. The diverter fluid can be pumped into a wellbore at sufficient pressures to create primary fractures as well complex microfracture networks in the subterranean formation. The diverter fluid can form a "film-like barrier" filter cake that controls fluid loss and diverts fluid to other areas or zones for stimulation. Proppant can be injected during or after to keep the generated fractures open. The diverter fluid can also be provided to help prevent or reduce well bashing during fracturing operations by diverting fluid from adjacent producing wells to prevent production losses from the adjacent wells.

The carbon-containing particulate can be modified to be dispersible in water-based or polar fluids, and then returned in a non-polar fluid such as hydrocarbons. However, it will be understood that carbon-containing particulate can be modified such that it disperses in a non-polar carrier fluid for a wellbore, and then return in a polar fluid, such as water. The non-polar delivery fluid may be in the form of a slurry.

The diverter fluid can be provided for conformance operations. The disclosed diverter fluids can be injected into water-containing zones to resist or block water from flowing into hydrocarbon zones. Furthermore, the disclosed diverter fluids can simply be injected without having to locate the sources of water production. For example, during such operations, the disclosed diverter fluids can naturally adsorb onto fracture matrices of the subterranean formation in water-permeable zones, form a water-impermeable filter cake thereon, and restrict the flow of water. The diverter fluids described herein can also be used with other conformance agents to enhance the restriction of fluid flow between water and hydrocarbon zones.

The use of the diverter fluid within a wellbore is not particularly restricted but can be used at any phase for control of downhole fluids.

Figure 1:
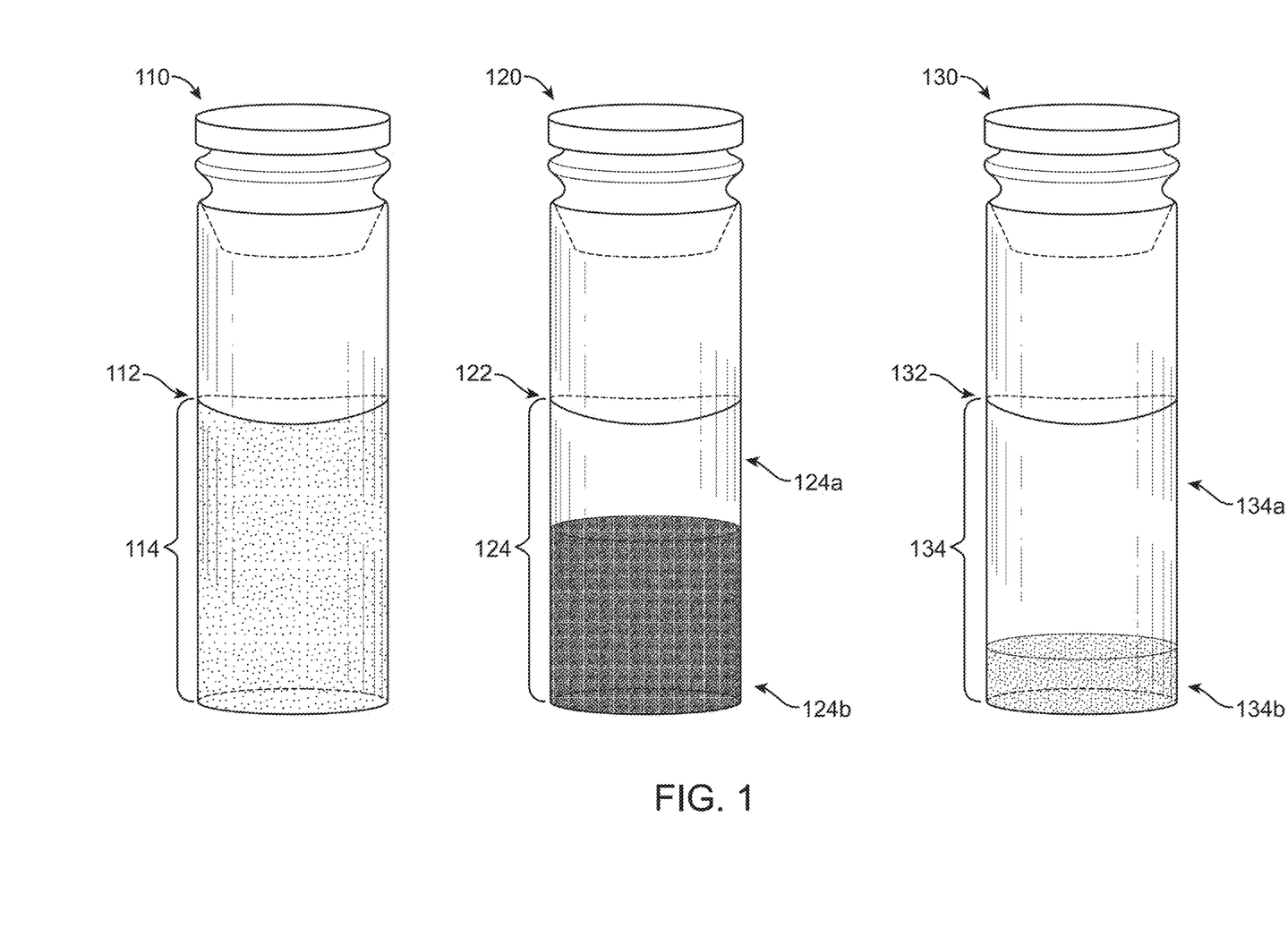
FIG. 1 is an illustration demonstrating dispersibility properties of graphene oxide and reduced graphene oxide in water.

Relative dispersibility of the carbon-containing particulate, and in particular the relatively dispersibility graphene oxide and reduced graphene oxide in water is illustrated in FIG. 1 (see also FIG. 4 discussed below). As shown on the left side of FIG. 1 is a glass container 110 having a meniscus 112 and a dispersion of graphene oxide in water 114. The graphene oxide in container 110 shows good polar dispersibility in water due to the presence of oxygen-containing substituents, such as alcohols, epoxides, carboxyls, carbonyls or other similar oxygen containing groups, which renders graphene oxide hydrophilic. The polar dispersibility renders the oxidized graphene helpful for injection and delivery downhole. However, it will likely not settle out of the carrier fluid sufficiently to form a filter cake, nor is it likely to dissolve in hydrocarbons downhole for return to the surface. In which case, it can be reduced downhole via a reducing agent to form reduced graphene oxide.

The middle glass container 120 has a meniscus 122 and a two phase solution 124. The two phase solution 124 comprises an upper portion of water 124*a* and a lower portion of reduced graphene oxide 124*b*. As shown in container 120, the reduced graphene oxide does not stay dispersed in water but rather settles toward the bottom of container 120. The reduced graphene oxide therefore shows poor polar dispersibility in water due to a lowered amount of oxygen-containing substituents which renders the reduced graphene oxide hydrophobic as compared to graphene oxide. Accordingly, the reduced graphene oxide can be first dispersed or suspended in a water based fluid via a gelling agent or perturbation with mixing or pumping energy, but however, in the absence of perturbation or with degradation of the gelling agent, has the tendency to settle at the bottom of the container 120. As a result of these properties, the reduced graphene oxide can be dispersed in a water based diverter fluid for injection into a wellbore. As the diverter fluid reaches the subterranean formation and the energy suspending the particles subsides, the reduced graphene oxide particulate will tend to settle on the formation face and form a filter cake. Further, due to the hydrophobicity of the reduced graphene oxide it will dissolve in and return to the surface upon contact with hydrocarbons.

The glass container 130 illustrates a fluid when less reduced graphene oxide is provided in water as compared to glass container 120. Glass Container 130 has a meniscus 132 and a two phase solution 134. The two phase solution 124 comprises an upper portion of water 134*a* and a lower portion of reduced graphene oxide 134*b*. As shown in container 130, even lesser amounts of reduced graphene oxide do not show good polar dispersibility in water due to the hydrophobic nature of the reduced graphene oxide. Accordingly, even with a small amount of reduced graphene oxide, it still does not disperse in water and remains insoluble.

The particular composition of carbon-containing particulates provided in the diverter fluid is discussed in the following. With respect to the composition of the diverter fluid, the carbon containing particulates to be dispersed in the diverter fluid can be a pristine allotrope of carbon. A pristine allotrope of carbon can be graphite, synthetic graphite, graphene, carbon nanoparticles, carbon microparticles, single- or multi-walled carbon nanotubes, carbon fibers, fullerenes such as $C_{60}$, $C_{70}$, $C_{76}$, $C_{82}$, $C_{84}$, and $C_{100}$, or fullerites. A pristine allotrope of carbon will generally be free of any chemical elements other than carbon, or contain a negligible amount of any chemical elements other than carbon. A negligible amount of any chemical elements other than carbon can be less than 0.01 wt %, alternatively less than 0.05 wt %, alternatively less than 0.1 wt %, alternatively less than 0.5 wt %, alternatively less than 1 wt %, and alternatively less than 2.5 wt %, alternatively 5% or less, alternatively 7.5 wt % or less, and alternatively 10 wt % or less than.

The carbon containing particulates can be modified to have oxygen containing groups. The oxygen containing groups can be any one or more of, alcohols, epoxides, carboxyls, carbonyls or other similar oxygen containing groups. The oxygen containing groups can be obtained via oxidation of pristine allotropes of carbon or can be inherent in the structure of the carbon containing particulate.

Oxidation of a carbon allotrope can be performed under various experimental procedures. In one procedure, a carbon allotrope, such as graphite, can be mixed in fuming nitric acid in the presence of potassium chlorate for 3-4 days at approximately 60° C., followed by washing and repetition of the procedure up to four times to obtain a graphene oxide. In another procedure, a single repetition of mixing graphite with potassium chlorate and concentrated sulfuric acid for 3-4 days at approximately 60° C. can be performed. In yet another procedure, termed the Staudenmaier-Hofmann reaction, graphite can be mixed with potassium chlorate, concentrated sulfuric acid, and sodium nitrate. In yet another procedure, termed the Hummers method, graphite can be mixed with potassium permanganate (an oxidant), concentrated sulfuric acid, and sodium nitrate.

Oxidation results in carbon allotropes having one or more of alcohols, epoxides, carboxyls, carbonyls on the surface of the carbon allotrope. If the carbon allotrope is a 2-D material, such as, for example, a single sheet of graphene, functional groups such as 1,2-epoxides and hydroxyl groups can populate the basal plane of the 2-D material while the edge planes of the 2-D material can be populated with carboxyls and hydroxyl groups. Oxidized carbon allotropes can have a carbon:oxygen (C:O) ratio of as high as 1:1, alternatively as high as 1.5:1, alternatively as high as 2:1, alternatively 2.5:1, alternatively as high as 3:1, alternatively as high as 3.5:1, alternatively as high as 4:1, alternatively as high as 4.5:1, alternatively as high as 5:1, alternatively as high as 5.5:1, and alternatively as high as 6:1.

An oxidized carbon allotrope can be any one of activated carbon, activated charcoal, graphene oxide, carbon black, oxidized carbon nano- or microparticles, oxidized single- or multi-walled carbon nanotubes, oxidized fullerenes or fullerites, or any other oxidized carbon allotrope known to one of skill in the art. The oxidized carbon allotrope can also be hydrothermal carbons produced from biomasses, hydrochars, humines or humic substances.

Oxidized carbon allotropes are generally hydrophilic in nature and therefore will exhibit good dispersibility in polar or water based fluids. These can be dispersed in the absence of a surfactant. These therefore facilitate injection into a wellbore and travel to desired locations downhole. The oxidized carbon allotropes for use in the disclosed diverter fluids can be reduced, or functionalized with hydrophobic chemical substituents, as described below, to increase hydrophobicity. The reduction or functionalization can to cause the carbon containing particulate to settle or fall out of the fluid and form a filter cake. These will also exhibit good dispersibility in non-polar fluids such as hydrocarbons.

An oxidized carbon allotrope can be partially reduced to obtain a reduced carbon oxide allotrope having a higher C:O ratio that of the oxidized carbon allotrope. Reduced carbon oxide allotropes (or reduced oxidized carbon-containing particulates) can have a C:O ratio of as high as 250:1, alternatively as high as 100:1, alternatively as high as 50:1, alternatively as high as 25:1; alternatively as high as 20:1, alternatively as high as 15:1, alternatively as high as 10:1, alternatively as high as 7.5:1, alternatively as high as 5:1, and alternatively as high as 3:1. A reduced carbon oxide allotrope can be performed via partial reduction of any one of the oxidized carbon allotropes referenced above, or any other oxidized carbon allotrope known to one of skill in the art.

The full or partial reduction (also referred to as "reduced" herein) of the carbon oxide allotrope can be carried out before, after or during delivery of the diverter fluid. For delayed agglomeration and formation of the filter cake, the diverter fluid containing one of the aforementioned oxidized carbon allotrope can be pumped downhole, and a reducing agent pumped after or with the fluid. Due to the higher temperature downhole and presence of the reduction agent (reducing agents are noted below), the carbon oxide allotrope can be reduced as they form the filter cake.

The reduced carbon allotrope will be not have natural polar dispersibility in water, but can be dispersed or suspended by the use of gelling agents.

Reduction of an oxidized carbon allotrope prior to delivery can be performed under various experimental procedures. In one procedure, an oxidized carbon allotrope can be partially reduced using a borohydride, such as for example sodium borohydride ($NaBH_4$), in an organic solvent such as methanol of tetrahydrofuran (THF) for 1 to 12 hours at temperatures ranging from about 20° C. to about 80° C. In another procedure, ammonia borane, in aqueous or organic solvents, can be used as the reducing agent. Resulting partially reduced carbon oxide allotropes can also be B-doped, N-doped or B/N-doped.

In yet another procedure, an oxidized carbon allotrope can be mixed with an aluminum hydride, such as lithium aluminum hydride, in a solution also having $NaBH_4$ and hydrazine for 1 to 12 hours at temperatures ranging from about 20° C. to about 80° C. for partial reduction.

In yet other procedures, hydrohalic acids such as HI, HBr or HCl, can accomplish partial reduction after about 0.5 to about 40 hours of stirring at about −10° C. to about 110° C. Resulting partially reduced carbon oxide allotropes can also be I-doped, Br-doped, or Cl-doped.

In yet another procedure, sulfur-containing reducing agents containing, for example, thiourea dioxide, thiourea, thiophene, $NaHSO_3$, $Na_2S_2O_4$, or Lawesson's reagent can be mixed with an oxidized carbon allotrope for about 15 minutes to about 24 hours at temperatures ranging from 20° C. to about 110° C. in an organic solvent or organic/aqueous solvent system for partial reduction. Resulting partially reduced carbon oxide allotropes can also be S-doped or have a portion of the sulfur-containing reducing agent adsorbed thereon.

In yet another procedure, a reducing agent having a nitrogen-containing compounds, such as, for example, ammonia, hydrazine, phenylhydrazine, hydroxylamine, pyrrole, benzylamine, p-phenylene diamine, ethylene diamine, urea, hexamethylenetetratmine, polyelectrolytes, or poly (amido amines) can be mixed with an oxidized carbon allotrope for about 1 hour to about 30 hours at temperatures ranging from 20° C. to about 100° C. in an organic solvent or organic/aqueous solvent system for partial reduction. Resulting partially reduced carbon oxide allotropes can also be N-doped or have a portion of the nitrogen-containing reducing agent adsorbed or covalently bound thereon.

In yet another procedure, a reducing agent having an oxygen-containing compound, such as, for example, an alcohol (such as methanol, ethanol, isopropanol, or benzyl alcohol), hydroquinone, L-ascorbic acid, glucose, dextran, or gallic acid can be mixed with an oxidized carbon allotrope for about 15 minutes to about 5 days at temperatures ranging from 20° C. to about 100° C. in an organic solvent or organic/aqueous solvent system for partial reduction. Resulting partially reduced carbon oxide allotropes can have a portion of the oxygen-containing reducing agent adsorbed thereon.

In yet another procedure, a metal-acid reducing agent such as, for example, Al/HCl, Fe/HCl, Zn/HCl, $Zn/H_2SO_4$, Sn(II)/HCl, Al foil/HCl, or Mg/HCl can be mixed with an oxidized carbon allotrope for about 5 minutes to about 7 hours under ambient temperature in an organic solvent for partial reduction. In yet another procedure, a metal-alkaline reducing agent such as, for example, Al foil/NaOH, Zn/NaOH, $Zn/NH_3$, or $Na/NH_3$ can be mixed with an oxidized carbon allotrope for about 10 minutes to about 6 hours at temperatures ranging from −78° C. to about room temperature in an organic solvent for partial reduction. Resulting partially reduced carbon oxide allotropes can be metal doped or N-doped (if $NH_3$ is used).

In yet another procedure, an amino acid reducing agent such as, for example, L-cysteine, glycine, L-lysine, or L-glutathione can be mixed with an oxidized carbon allotrope for about 6 hours to about 72 hours at temperatures ranging from about 20° C. to about 95° for partial reduction. Resulting partially reduced carbon oxide allotropes can have a portion of the amino acid reducing agent adsorbed thereon.

In yet another procedure, a plant extract such as, for example, green tea, *C. esculenta* leaf, *M. ferrea Linn.* leaf, *C. sinensis* peel, or *R. damascena* can be mixed with an oxidized carbon allotrope for about 1 hour to about 6 hours at temperatures ranging from about 20° C. to about 95° C. for partial reduction. Resulting partially reduced carbon oxide allotropes can have a portion of the plant extract adsorbed thereon.

In yet another procedure, a microorganism such as, for example, *shewanella*, *E. Coi* culture or *E. Coli* biomass, Baker's yeast/NADPH, or wild carrot roots can be mixed under either anaerobic or aerobic conditions, depending on the microorganism, with an oxidized carbon allotrope for about 48 hours to about 72 hours at temperatures ranging from about 20° C. to about 40° C. for partial reduction. Resulting partially reduced carbon oxide allotropes can have a portion of the microorganism adsorbed thereon.

The carbon-containing particulate can be modified or functionalized for specific interaction with the rock formation (which is often shale), or with fracturing fluid, stimulation fluids, conformance fluids, and additives provided downhole. For example, the carbon-containing particulate can be activated, functionalized or coated such that the attached groups may cover the lattice structure by penetrating the pores located on the surface of the rock formation face while simultaneously allowing the carbon-containing particulate to form a sheet or leaf across the formation face. Consequently, the surface of the formation face presented to the well environment may be substantially nonionic and thereby repel water. This can inhibit fluid loss to the formation as well as aid in the retention of the rock formation internal structure.

The carbon-containing particulates include carbon allotropes which are pristine, oxidized, or oxidized carbon allotropes which have been partially reduced, can be functionalized with one or more functional groups or coated with a material having one or more functional groups. In general, pristine carbon allotropes can be functionalized via formation of covalent bonds between compounds forming free radicals or dienophiles and C=C bonds of the pristine carbon allotrope. In general, functionalization of oxidized carbon allotropes, or oxidized carbon allotropes which have been partially reduced, can be performed via covalent bonds formed between the added functional groups and oxygen-containing species on the carbon allotrope. Furthermore, in general, functionalization or coating can occur covalently or non-covalently.

Functionalization of the carbon-containing particulates with chemical species having polar groups at or near the terminus of the chemical species allows for dispersion in a water based delivery fluid. Due to such dispersion, it is more easily handled, mixed and introduced into the wellbore, formation or desired zones. Accordingly, the fluid for delivery can be the same as that used for water flooding, and can include any water based fluid or water miscible fluid. Rather than polar groups, the carbon-containing particulates can be functionalized with non-polar or hydrophobic functionalities. Hydrophobic functionalities can serve to resist the flow of water and can enhance the flow of hydrocarbons. The inclusion of both hydrophilic and hydrophobic groups on the carbon-containing particulates simultaneously and separately permits multiple advantageous functions.

The carbon containing particulates can be functionalized with, for example, alkanes, alkenes, alkynes, alcohols, aromatics, ethers, esters, aldehydes, ketones, carboxylates, carbonates, acyl halides nitriles, nitrides, nitros, nitrosyls, amines, amides, azides, imines, imides, cyanates, nitrates, sulfides, sulfoxides, sulfones sulfonates, sulfonate esters, thiols, phosphines, phosphites, phosphates, halogens, haloalkanes, hydroxysilanes, alkoxysilanes, alkylsilanes, arylsilanes, siloxanes, zwitterions such as, for example, alkyl- or arylammonium ions or alkyl- or arylphosphonium ions, any combination thereof, or any other suitable functional group. The functional groups can be hydrophilic, hydrophobic, or amphiphilic. The functional groups can further serve as ligands for the coordination of metal cations, metal nanoparticles, metal oxide nanoparticles, or any combination thereof. One of ordinary skill in the art can appreciate that the choice and relative amount of hydrophobic, hydrophilic, and/or amphiphilic groups on the carbon-containing particulates can be decided on a case-by-case basis depending on the composition of the subterranean formation and additives or other fluids mixed or injected with the diverter fluid, as described below.

In one procedure, functionalization of pristine carbon allotropes can be performed via formation of covalent bonds between compounds forming free radicals. Free radical addition can be performed using compounds including, but not limited to, diazonium salts such as, for example, unsubstituted or substituted benzenediazonium tetrafluoroborates, hydroxylated aryl groups, unsubstituted or substituted benzoyl peroxides, or unsubstituted or substituted nitrophenyls.

In another procedure, functionalization of pristine carbon allotropes can be performed via formation of covalent bonds between dienophiles and C=C bonds of the pristine carbon allotrope. Dienophiles can be formed from compounds including azomethine ylide precursors, phenyl and alkyl azides, p-substituted perfluorophenylazides, unsubstituted or substituted phenylalanines, or unsubstituted or substituted arynes.

In one procedure, functionalization of an oxidized carbon allotrope or partially reduced carbon oxide allotrope having carboxylic acid groups can be performed by activation of the carboxylic acid followed by addition of a nucleophilic group. The activator can be, for example, thionyl chloride ($SOCl_2$), 1-ethyl-3-(3-dimethylaminopropyl)-carbodiimide (EDC), N,N'-dicyclohexylcarbodiimide (DCC), or 2-(7-aza-1H-benzotriazole-1-yl)-1,1,3,3-tetramethyluronium hexafluorophosphate (HATU). The nucleophilic group can be, for example, an amine or hydroxyl, or isocyanate derivatives and form a corresponding amide, ester, or carbamate ester on the carbon allotrope.

In another procedure, functionalization of an oxidized carbon allotrope or partially reduced carbon oxide allotrope having epoxy groups can be performed by ring-opening reactions. The ring opening reactions can take place via nucleophilic attack at the a-carbon of the epoxide by nitrogen or oxygen-containing functional group. Exemplary nitrogen-containing functional groups for ring opening reactions include, but are not limited to, long-chain aliphatic or aromatic amines such as, for example, octadecylamine, 1-phenylbutylamine, phenylene diamine allylamine or, ionic liquids or imidazolium derivatives such as, for example, (1-(3-aminopropyl)-3-methylimidazolium bromide, amine-containing alkoxysilanes or hydroxysilanes, such as, for example, 3-aminopropyltriethoxysilane or 3-aminopropyltrihydroxysilane or N-[3-(trimethoxysilyl)propyl] ethylenediamine or N-[3-(trihydroxysilyl)propyl] ethylenediamine, or amine-containing polymers such as, for example, poly(allylamine) or poly(acrylamide). Exemplary oxygen-containing functional groups include, but are not limited to, p-phenyl sulfonate, —$CH_2OH$ terminated regioregular poly(3-hexylthiophene), and poly(ethylene glycol).

In another procedure, metal nanoparticles can be deposited on the surface of a carbon-containing particulate, such as graphene oxide, reduced graphene oxide or pristine graphene, by addition of metal salt precursors which are subsequently reduced in a solvent containing the carbon-containing particulate. Organic functionalities immobilized on the carbon-containing particulate can serve as a ligand to coordinate the metal nanoparticles. Furthermore, the organically functionalized carbon-containing particulates can be used as scale inhibitors or to provide additional strength for fluid diversion by crosslinking with the metal nanoparticles.

In one non-limiting example, gold nanoparticles can be deposited on an octadecylamine-functionalized carbon-containing particulate by addition of $AuCl_4$ and reduction with $NaBH_4$ in THF as the solvent. In another non-limiting example, a platinum or a palladium salt, in the form of, for example, $H_2PtCl_6$ or $H_2PtCl_6$, can be reduced using a borohydride to form Pt or Pd nanoparticles on oxidized carbon-containing particulates. In yet another non-limiting example, platinum or platinum/Rhodium nanoparticles can be deposited on a carbon-containing particulate via reductive annealing under $H_2/Ar$ atmosphere, reduction using ethylene glycol, reduction using oleylamine and $NaBH_4$, or electrochemical reduction. In yet another non-limiting example, metal nanoparticles or metal alloy nanoparticles can be deposited on carbon-containing particulates via reduction of the corresponding metal salts in a water based dispersion of the carbon-containing particulates using microwaves and reducing agents such as hydrazine hydrate, ethylenediamine, or ammonium hydroxide. In yet another non-limiting example, gold, silver and/or copper nanoparticles can be deposited on carbon-containing particulates using a mixture of oleylamine and oleic acid as the reducing agent. In yet another non-limiting example, gold, platinum, and/or palladium nanoparticles can be deposited on carbon-containing particulates using an ethylene glycol/water mixture. Metal nanoparticles can be formed from metal salts including a $d^6$-$d^9$ metal or combination of $d^6$-$d^9$ metals. Particularly, nanoparticles can be formed from metal salts including iron, cobalt, nickel, copper, rhodium, palladium, silver, platinum, gold, or any combination thereof.

In another procedure, metal oxide nanoparticles can be deposited on the surface of a carbon-containing particulate, such as graphene oxide, reduced graphene oxide or pristine graphene. Organic functionalities immobilized on the carbon-containing particulate can serve as a ligand to coordinate the metal oxide nanoparticles. Furthermore, the organically functionalized carbon-containing particulates can be used as scale inhibitors or to provide additional strength for fluid diversion by crosslinking with the metal oxide nanoparticles.

In one non-limiting example, tin oxide ($SnO_2$) or titanium oxide ($TiO_2$) nanoparticles can be deposited on carbon containing particulates via hydrolysis of $SnCl_4$ or $TiCl_3$, respectively, in a dispersion of the carbon-containing particulates. In another non-limiting example, tin oxide ($SnO_2$) nanoparticles can be deposited on oxidized carbon-containing particulates via electrostatic attraction of $Sn^{4+}$ cations to the oxygen groups of oxidized carbon-containing particulate using water as a solvent. In another non-limiting example, manganese oxide ($Mn_3O_4$) nanoparticles can be deposited on carbon-containing particulates via hydrolysis of a Mn salt in a suspension containing a carbon-containing particulate in $DMF/H_2O$, followed by hydrothermal reduction. In another non-limiting example, metal oxides such as $MnO_2$, $CuO$, $Co_3O_4$, $CoO$, $Fe_3O_4$, $TiO_2$, or $Li_4Ti_5O_{12}$, can be deposited on a carbon-containing particulate by deposition of the corresponding metal hydroxide followed by calcination at elevated temperatures (for example, 300-600° C.). In another non-limiting example, zinc oxide (ZnO) nanoparticles can be deposited on carbon-containing particulates via mixing the ZnO nanoparticles with the carbon-containing particulate in ethanol. In another non-limiting example, magnetite nanoparticles can be deposited on carbon-containing particulates via co-precipitation of $Fe^{3+}/Fe^{2+}$ (from $FeCl_3$ and $FeCl_2$, respectively) in an ammonia solution having the carbon-containing particulate dispersed therein. In another non-limiting example, $Fe_3O_4$ nanoparticles can be deposited onto a carbon containing partuclate via modifying surface of the $Fe_3O_4$ nanoparticles with tetraethylorthosilicate (TEOS) and a (3-aminopropyl)trialkoxysilane, to yield amine functionalized $Fe_3O_4$ nanoparticles. The amine functionalized $Fe_3O_4$ nanoparticles can then be reacted with carboxylic acid sites on the carbon-containing particulate using a suitable cross-linking agent. Metal oxide nanoparticles can be formed from metal salts including a $d^3$-$d^{10}$ metal, metalloid, or any combination thereof. Particularly, metal oxide nanoparticles can be formed from metal salts including titanium, zirconium, vanadium, chromium, molybdenum, manganese, tungsten, iridium, ruthenium, iron, cobalt, nickel, copper, rhodium, palladium, silver, platinum, gold, cadmium, zinc or metalloid salts including, boron, aluminum, gallium, carbon, silicon, tin, or any combination or metals or metalloid salts.

In at least one non-limiting example, zwitterions such as, for example, alkyl- or arylammonium ions or alkyl- or arylphosphonium ions, any combination thereof, can be functionalized on the surface of carbon-containing particulates. Zwitterion functionalized carbon-containing particulates can be used in dispersions as both a diverter material and a clay stabilizer during a well bore stimulation process.

The above examples are for illustrative purposes only and are not meant to be limiting in any way with respect to the type of organic, inorganic (that is, metal or metalloid), organometallic, or organometalloid functionalities or method of immobilization on or addition to a carbon-containing particulate.

To form a diverter fluid having carbon-containing particulates, the following method can be implemented. First, a carbon-containing material can be ground to form a carbon-containing particulate. The term "particulate" is defined as a microscopic or macroscopic solid in the form of separate and discrete particles, and can include nanoparticles.

The carbon-containing material can be ground using a mortar and pestle, a ball mill, a bead mill, a rod mill, an autogenous mill, a SAG mill, a pebble mill, a tower mill, a jet mill a Buhrstone mill, high pressure grinding rolls, or any other apparatus known to one of skill in the art to reduce particulate size. The carbon-containing material can be ground over varying periods of time to achieve a desired average particulate size, and can include nanoparticles. The average particulate size can range from about 10 nm to about 1000 μm, alternatively from about 100 nm to about 500 μm, alternatively from about 500 nm to about 100 μm, alternatively from about 1 μm to about 50 μm, alternatively from about 20 μm to about 40 μm, and alternatively about 30 μm.

While average particle ranges are as disclosed above, one of ordinary skill will appreciate that the average size of the carbon-containing particulate to be used in a diverter fluid may depend upon the size of the fractures or fracture matrices in the subterranean formation. Furthermore, one of ordinary skill will appreciate that, in subterranean formations have multiple fractures of varying sizes, diverter fluids having carbon-containing particulates of various average sizes can be used, wherein each is specific to the size of fractures within the subterranean formation.

Second, the formed carbon-containing particulate can be added to a water based fluid to suspend the particles in the system. The fluid can be water based, any combination of water and one or more organic fluid. Additionally, the type and amount of fluid system can depend on the intended hydrophobicity or hydrophilicity, or functional groups, of the carbon-containing particulate. The fluid system can include, but is not limited to, water, linear or branched alcohols, aromatic hydrocarbons, linear or branched aliphatic hydrocarbons, chlorinated fluids, acetone, dimethyl sulfoxide, N,N-dimethylfornnannide, N-methyl-2-pyrrolidine, pyridine, toluene, o-xylene, nitriles, ethers or any other suitable fluid known to one of skill in the art.

The mixture including the fluid system and carbon-containing particulate can then be further mixed to form a carbon-containing particulate dispersion. Mixing can be performed by any means including, but not limited to, mechanical or magnetic stirring, sonication, ultrasonication, agitation or any other mixing technique known to one of skill in the art. Mixing can occur at temperatures ranging from the about the freezing point of the fluid system to about the boiling point of the fluid system.

The carbon-containing particulate dispersion can have a concentration of up to 0.001 mg particulate per 1 mL of fluid system (0.001 mg/mL), alternatively a concentration of up to 0.0025 mg/mL, alternatively a concentration of up to 0.005 mg/mL, alternatively a concentration of up to 0.0075 mg/mL, alternatively a concentration of up to 0.01 mg/mL, alternatively a concentration of up to 0.025 mg/mL, alternatively a concentration of up to 0.05 mg/mL, alternatively a concentration of up to 0.075 mg/mL, alternatively a concentration of up to 0.1 mg/mL. The carbon containing particulate dispersion can be 0.001 w/v %, alternatively 0.005 w/v %, alternatively 0.01 w/v %, alternatively, 0.05 w/v %, alternatively, 0.1 w/v %, alternatively 0.5 w/v %, alternatively 1.0 w/v %, alternatively, 2.5 w/v %, alternatively 5 w/v %, 7.5 w/v %, and alternatively 10 w/v %. The concentration of the can depend on the degree of hydrophobicity or hydrophilicity of the carbon-containing particulate and the degree of hydrophobicity or hydrophilicity, polarity, and/or protic or aprotic nature of the fluid system.

The carbon-containing particulate dispersion, as described herein, can be further modulated by the addition of one or more of fracturing fluids, proppants, viscosity enhancing agents, surfactants, electrolytes, such as an organic or inorganic salts, friction reducers to assist flow when pumping, gases, or any other compositions used in subterranean wellbore operations known to one of ordinary skill in the art, to form the diverter fluid.

In some instances, carbon-containing particulates can be dispersed in a fracturing fluid or if already disperse in a water based fluid to form the diverter fluid can be further mixed with a fracturing fluid or other fluid. The dispersion or mixture can further include a delayed release reducing agent. Upon injection of the dispersion or mixture into a well bore and subsequently into fractures and/or microfractures and wormholes of a subterranean formation, the delayed release reducing agent can reduce the oxidized carbon allotropes to form hydrophobic aggregates of reduced carbon oxide allotropes for enhanced diversion properties of the carbon-containing particulates.

The gelling agents herein can include hydroxyethylcellulose, hydroxyalkylguar, hydroxyalkylcellulose, carboxyalkylhydroxyguar, carboxyalkylhydroxyalkylguar, starch, gelatin, poly(vinyl alcohol), poly(ethylene imine), guar, xanthan, polysaccharide, cellulose, synthetic polymers, any derivatives thereof, and combinations thereof. In some embodiments, the concentration of gelling agents present is from about 30 pounds per gallon (ppg) to about 50 ppg. The gelling agent can be cross-linked by providing a crosslinking agent. The crosslinking agent may be a metal crosslinking agent, for example, a borate ion, a metal ion, or similar component that is capable of crosslinking at least two molecules of a gelling agent. Cross-linking agents include boron derivatives, potassium periodate, potassium iodate, ferric iron derivatives, magnesium derivatives, and combinations thereof. Breakers can be provided during delivery of the gelling agent into the wellbore or after. The breakers can break or degrade the gelling agent thereby releasing the carbon-containing particulate. All types of breakers known in the art are contemplated, including, for example, oxidative breakers, acid breakers, delayed release acid breakers, delayed release enzyme breakers, temperature activated breakers, hydrolysable ester breakers, and any combination thereof. Suitable examples of enzymes include, but are not limited to, alpha and beta amylases, amyloglucosidases, invertases, maltases, cellulases, hemicellulases, etc.

In some cases, the diverter fluid further can further include a proppant. Suitable proppant materials include but are not limited to, sand, graded gravel, glass beads, sintered bauxite, resin-coated sand, ceramics, and intermediate-strength ceramics. Proppants can be present in the diverter fluid in an amount in the range of from about 0.01 v/v % to about 80 v/v %.

When using proppant, after a specified amount of proppant can be deposited into the formation, the wellbore is shut in by closing a valve at the surface for a period of time sufficient to permit stabilization of the subterranean formation. Contact with formation fluids such as oil and hydrocarbons results in dispersion of the carbon-containing particulates of the diverter fluid thereby allowing the oil or hydrocarbons to flow from the subterranean formation to the wellbore for extraction operations. Following dispersion, the carbon particulates can flow out of the fracture leaving the proppant material, when present, behind to hold the fractures open.

A viscosity-enhancing agent can optionally be added to the diverter fluid composition. The viscosity-enhancing agent is capable of enhancing the formation of covalent or non-covalent bonds between hydrophobic groups on the carbon-containing particulates and/or between hydrophobic or hydrophilic species of the subterranean formation. The viscosity-enhancing agent can be in the form of a liquid gel concentrate.

When added to the diverter fluid composition, viscosity-enhancing agents can further increase the viscosity of the diverter fluid, having carbon-containing particulate dispersed therein. Suitable viscosity-enhancing agents include, but are not limited to, fatty alcohols, ethoxylated fatty alcohols, and amine oxides having hydrophobic chain lengths of 6 to 22 carbon atoms, and mixtures thereof. The viscosity-enhancing agent can increase the viscosity of the composition above that attainable by the polymer and surfactant alone. The viscosity-enhancing agent can also make the diverter fluid composition, with carbon-containing particulates dispersed therein, less sensitive to phase separation. When included in the diverter fluid composition, the viscosity-enhancing agent is often present in an amount of 4.5 lb/gal. Alternatively, the viscosity-enhancing agent can be present in the diverter fluid composition in an amount ranging from about 0.1 lb/gal to about 10 lb/gal, alternatively from about 0.5 lb/gal to about 8 lb/gal, alternatively from about 1 lb/gal to about 7 lb/gal, alternatively from about 2 lb/gal to about 6 lb/gal, alternatively 3 lb/gal to about 5 lb/gal, and alternatively 4 lb/gal to about 5 lb/gal.

Using a viscosity enhancing agent, the diverter fluid, containing a hydrophobic carbon-containing particulate, can be transported to the oil or hydrocarbon well as a microemulsion in the viscosity-enhancing agent. The viscosity-enhancing agent, having the microemulsion therein, can be injected downhole in water. After injection of the microemulsion, an emulsion breaker can be added to degrade the viscosity-enhancing agent and facilitate release of the diverter fluid. The carbon-containing particulates of the diverter fluid can then interact with fractures, wormholes, or fracture matrices of the formation rock and form a water impermeable filter cake thereon. The diverter fluid of the present disclosure can also include additional constituents or materials.

For hydrophilic carbon-containing particulates herein, such as when functionalized with oxygen, and in particular graphene oxide, the carbon-containing particulate can be dispersed in the absence of a surfactant due to the natural polar dispersibility of the particulate.

However, some diverter fluids according to the present disclosure can also include a surfactant. Any surfactant for which its ability to aid the dispersion and/or stabilization of the diverter fluid can be used.

In some instances, the surfactant can be an ionic surfactant. Examples of suitable ionic surfactants include anionic surfactants such as alkyl carboxylates, alkyl ether carboxylates, alkyl sulfates, alkyl ether sulfates, alkyl sulfonates, alpha-olefin sulfonates, alkyl ether sulfates, alkyl phosphates and alkyl ether phosphates.

Examples of suitable ionic surfactants also include cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include surfactants that are usually regarded as zwitterionic surfactants, and in some cases as amphoteric surfactants, such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some instances, the surfactant is a cationic, zwitterionic or amphoteric surfactant containing an amine group or a quaternary ammonium group in its chemical structure ("amine functional surfactant"). In other instances, the surfactant can be a blend of two or more of the surfactants described above, or a blend of any of the surfactant or surfactants described above with one or more nonionic surfactants. Examples of suitable nonionic surfactants include alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants can be used in the diverter fluid. These fluids can incorporate the surfactant or blend of surfactants in an amount of about 0.02 w/v % to about 100 w/v %, alternatively from about 0.05 w/v % to about 80 w/v %, alternatively from about 0.1 w/v % to about 60 w/v %, alternatively from about 0.5 w/v % to about 40 w/v %, alternatively from about 1 w/v % to about 20 w/v %, and alternatively from about 5 w/v % to about 10 w/v %.

Other materials which can be included in a diverter fluid include electrolytes, such as organic or inorganic salts, friction reducers to assist flow when pumping, or any other suitable material known to one of skill in the art.

A diverter fluid can be formed by injecting gas (most commonly nitrogen, carbon dioxide or mixture thereof) into diverter fluid or into the wellbore concomitantly with the diverter fluid. Dispersion of the gas into the fluid in the form of bubbles increases the viscosity of the fluid and can positively influence its performance, particularly its ability to effectively induce hydraulic fracturing of the formation, and capacity to carry solids. The presence of the gas also enhances the flowback of the fluid when this is required.

The diverter fluids described herein can also be used with other conformance agents to enhance the restriction of fluid flow between water and hydrocarbon zones. Other conformance agents can include, for example, H2Zero® Conformance Control materials from Halliburton Energy Services, Inc. When a polymeric conformance agent is used with a diverter fluid, as disclosed herein, an acid solution can be subsequently injected into the well bore if need be to degrade and facilitate removal of the polymeric conformance agent.

The diverter fluids described herein can be mixed with a pad fluid to help prevent or reduce well bashing during fracturing operations by diverting fluid from adjacent hydrocarbon producing wells to prevent production loss from the adjacent wells.

Illustrations

Figure 2:
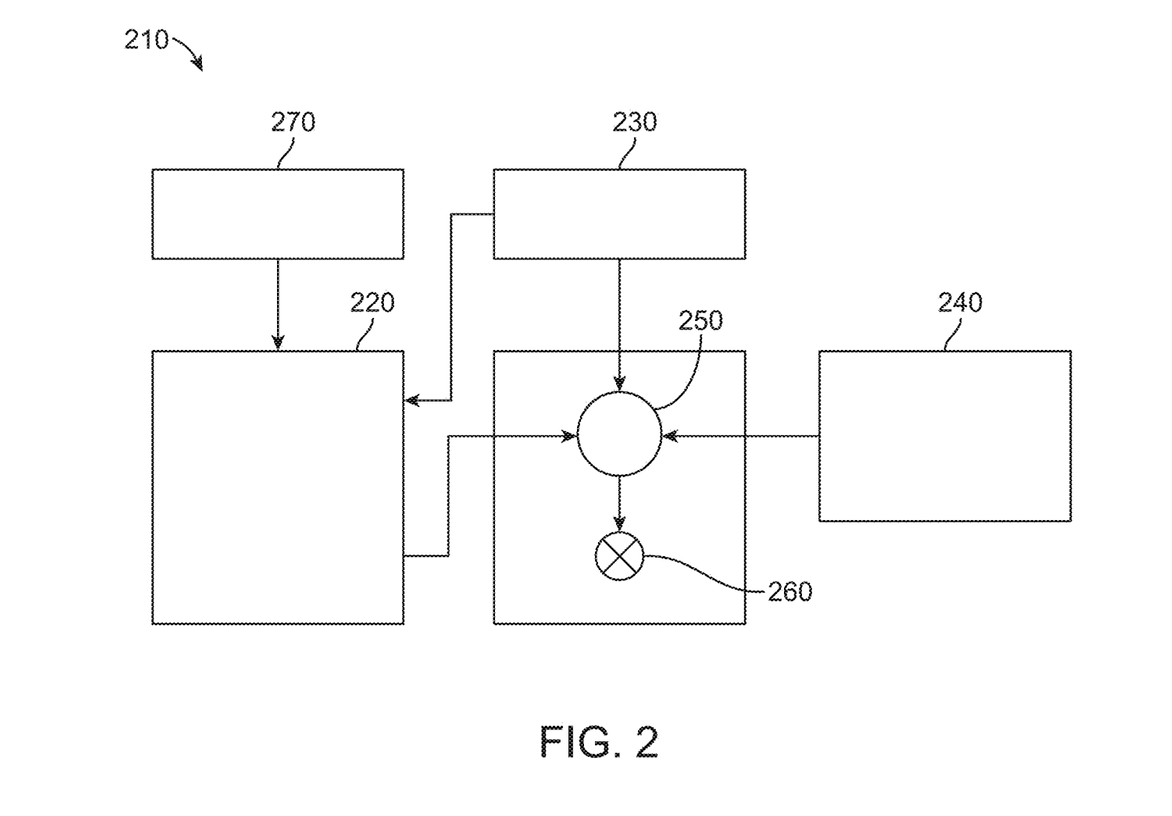
FIG. 2 is a diagram illustrating an example of a fracturing system that can be used in association with certain embodiments of the present disclosure.
Figure 3:
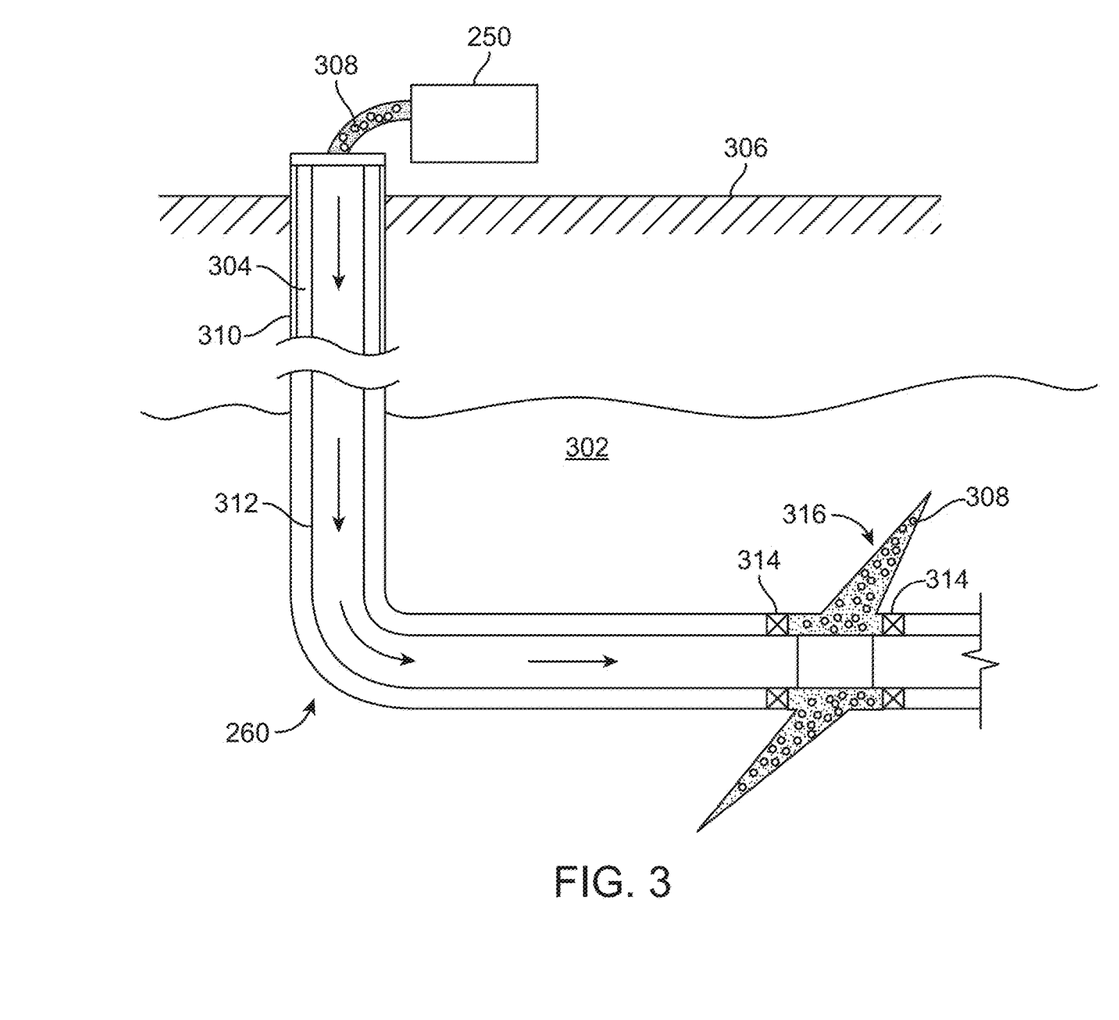
FIG. 3 is a diagram illustrating an example of a subterranean formation in which a fracturing operation can be performed in association with certain embodiments of the present disclosure.

Although the diverter fluid disclosed herein can be employed in any number of phases of oilfield production, its use with respect to fracturing is exemplarily described with respect to FIGS. 2-3.

In particular, the exemplary methods and compositions disclosed herein can be directly or indirectly affected by, or affect one or more components or pieces of equipment associated with the preparation, delivery, recapture, recycling, reuse, and/or disposal of the disclosed compositions. For example, and with reference to FIG. 2, the described methods and compositions can directly or indirectly utilize, and/or affect one or more components or pieces of equipment associated with an exemplary fluid injection system 210, according to one or more disclosed embodiments. In certain instances, the fluid injection system 210 includes an injection fluid producing apparatus 220, a fluid source 230, a proppant source 240, and a pump and blender system 250 (blending and pumping equipment) and resides at the surface at a well site where a well 260 is located. The fluid source 230 can include the pre-made diverter fluids disclosed herein. Additives can be added to the fluid source 230 from additive source 270 at injection fluid apparatus 220. Alternatively, the fluid source 230 can be water, saltwater, brine, or other water based fluid and provided with carbon-containing particulate from additive source 270 and mixed together for injection at injection fluid apparatus 220. The carbon-containing particulate can include reduced graphene oxide. Alternatively, the carbon-containing particulate can include graphene oxide, and then a reducer can be pumped downhole subsequently from additive source 270 for example.

In certain instances, the fluid producing apparatus 220 combines the fluid source 230 (which can include the diverter fluid here) with additives from additive source 270 to produce a fluid that is injected into the formation. The fluid can be a fluid for ready use in a fracture stimulation treatment of the well 260 or a concentrate to which additional fluid is added prior to use in a fracture stimulation of the well 260. In other instances, the fluid producing apparatus 220 can be omitted and the injection fluid can be sourced directly from the fluid source 230.

The fluid source 230 can include the diverter fluids disclosed herein. Alternatively, the fluid source can be water, or other water based fluid and provided with carbon-containing particulate from additive source 270. The fluid source 230 can include fracturing fluids, diverter fluids, or a combination of the two. The fluid can include water, a hydrocarbon fluid, a polymer gel, foam, air, wet gases, and/or other fluids. The fluids can be injected for pre- or post-fracturing hydrocarbon recovery operations.

Initially, the diverter fluid can be included as the fluid source 230 and then pumped downhole without mixing the proppant source 240, and then after fracturing, the proppant can be provided downhole. Alternatively, the diverter fluid and proppant can be mixed at the pump and blender system 250 and provided simultaneously downhole in well 260.

The proppant source 240 can include a proppant for combination with the diverter fluid composition described herein, fracturing fluids and/or any other fluids to be injected known to one of skill in the art. Additive source 270 can also, or alternatively, include one or more additives (e.g., gelling agents, weighting agents, and/or other optional additives) to alter the properties of the injection fluid. For example, the other additives can be included to reduce pumping friction, to reduce or eliminate the fluid's reaction to the geological formation in which the well is formed, to operate as surfactants, and/or to serve other functions.

The pump and blender system 250 receives the injection fluid, having the diverter fluid, fracturing fluid, or other fluids and combines it with other components, including proppant from the proppant source 240 and/or additional fluid from the additive source 270. The resulting mixture can be pumped down the well 260 under a pressure sufficient to create or enhance one or more fractures in a subterranean zone, for example, to stimulate production of fluids from the zone. Notably, in certain instances, the fluid producing apparatus 220, fluid source 230, and/or proppant source 240 can be equipped with one or more metering devices (not shown) to control the flow of fluids, proppants, and/or other compositions to the pumping and blender system 250. Such metering devices can permit the pumping and blender system 250 to source from one, some or all of the different sources at a given time, and can facilitate the preparation of injection fluids in accordance with the present disclosure using continuous mixing or "on-the-fly" methods. Thus, the pumping and blender system 250 can provide only fracturing fluid into the well at any particular time, only proppants at any particular time, only the diverter fluids as described herein at any particular time, or combinations of thereof at any particular time. Moreover, the pump can be used to inject fluids in secondary operations, including for example the diverter fluids described herein, into the well.

FIG. 3 shows the well 260 during a fluid injection operation in a portion of a subterranean formation of interest 302 surrounding a wellbore 304. The wellbore 304 extends from the surface 306, and the fracturing fluid 308 is applied to a portion of the subterranean formation 302 surrounding the horizontal portion of the wellbore. Although shown as vertical deviating to horizontal, the wellbore 304 can include horizontal, vertical, slant, curved, and other types of wellbore geometries and orientations, and the injection fluid can be applied to a subterranean zone surrounding any portion of the wellbore. The wellbore 304 can include a casing 310 that is cemented or otherwise secured to the wellbore wall. The wellbore 304 can be uncased or include uncased sections. Perforations can be formed in the casing 310 to allow fracturing fluids, the diverter fluid compositions described herein, and/or other materials to flow into the subterranean formation 302. In cased wells, perforations can be formed using shape charges, a perforating gun, hydro-jetting and/or other tools.

The well 260 is shown with a work string 312 depending from the surface 306 into the wellbore 304. The pump and blender system 250 is coupled a work string 312 to pump the injection fluid 308 into the wellbore 304. The working string 312 can include coiled tubing, jointed pipe, and/or other structures that allow fluid to flow into the wellbore 104. The working string 312 can include flow control devices, bypass valves, ports, and or other tools or well devices that control a flow of fluid from the interior of the working string 312 into the subterranean zone 302. For example, the working string 312 can include ports adjacent the wellbore wall to communicate the injection fluid 308 directly into the subterranean formation 302, and/or the working string 312 can include ports that are spaced apart from the wellbore wall to communicate the injection fluid 308 into an annulus in the wellbore between the working string 312 and the wellbore wall.

The working string 312 and/or the wellbore 304 can include one or more sets of packers 314 that seal the annulus between the working string 312 and wellbore 304 to define an interval of the wellbore 304 into which the injection fluid 308 will be pumped. FIG. 3 shows two packers 314, one defining an uphole boundary of the interval and one defining the downhole end of the interval. When the injection fluid 108, comprising a fracturing fluid, is introduced into wellbore 304 (e.g., in FIG. 3, the area of the wellbore 304 between packers 314) at a sufficient hydraulic pressure, one or more fractures 316 can be created in the subterranean zone 302.

The diverter fluid, as described herein, in the injection fluid 308 can enter the fractures 316. The diverter fluid can also form and enter microfactures and wormholes. The carbon-containing particulates of the diverter fluid, when hydrophobic in nature, can coat surfaces of the one or more fractures 316 and form a filter cake. When in the presence of hydrophilic media, such as fresh water, salt water, brine, or any other water based media, the carbon-containing particulates can form an impermeable filter cake through which aqueous media cannot pass. When in the presence of hydrophobic media, such as hydrocarbons, oil, or any other desired organic media, the filter cake including the hydrophobic carbon-containing particulates can disperse into the hydrophobic media, allowing for flow of the hydrophobic media into the wellbore 304 from the one or more fractures 316 for retrieval. The hydrophobic carbon-containing particulates can also be retrieved with and from the hydrophobic media, purified, recycled, and reused in subsequent fracturing operations as described above.

Proppant particulates in the injection fluid 308 can also enter the fractures 316 where they can remain after other fluids, such as fracturing fluid, flows out of the wellbore. These proppant particulates can "prop" fractures 316 such that fluids can flow more freely through the fractures 316.

While not specifically illustrated herein, the disclosed methods and compositions can also directly or indirectly affect any transport or delivery equipment used to convey the compositions to the fluid injection system 210 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

As previously discussed, many hydrocarbon reservoirs are also accompanied by the presence of water within the formation which can complicate hydrocarbon production. The production of water increases costs, reduces productivity of the well, and can lead to abandonment when the amount of produced water becomes too high. While hydrocarbons are initially drawn from the reservoir based on the natural pressure of the system, once the pressure decreases or the fraction of produced water becomes too high, other operations can be conducted to increase pressure and increase the hydrocarbon extraction. As previously described, one of the primary techniques employed as a secondary recovery process is water flooding.

Water flooding involves the injection of brine, saltwater, seawater, aqueous fluid or some other fluid into the formation to drive, or sweep, hydrocarbon to a production well which is then drawn to the surface. The pumping system shown in FIG. 2 can be used to inject the fluid during water flooding operations. Notably, the formation contains permeable rock as well as fractures through which the water and hydrocarbon flow. Different zones within the formation can contain varying amounts of hydrocarbon and water, with some zones being made up substantially of water and others of hydrocarbon. Furthermore, the formation rock varies in its permeability, with some zones being of higher permeability and other zones having low permeability. It is desirable to flush or sweep the hydrocarbon zones while minimizing the flow of water from such water zones. Injected water from water flooding can initially have a tendency to enter the zones of least resistance; i.e., those of high permeability, and in turn leave low permeability zones untouched with hydrocarbon remaining in those formations. This reduces conformance, decreases hydrocarbon production from the reservoir and results in increased costs.

The diverter fluids disclosed herein, having carbon-containing particulates dispersed therein, can be employed in any number of ways to block or resist water from flowing into zones where it is not desired. For example, the disclosed diverter fluids can be injected into water-containing zones to resist or block water from flowing to hydrocarbon zones. Furthermore, the diverter fluid can simply be injected without having to locate the sources of water production. For example, during such operations it can naturally adsorb onto the formation in permeable zones, form a water-impermeable filter cake thereon, and restrict the flow of water.

The diverter fluids described herein can also be employed during any phase of hydrocarbon production from a reservoir, for example after drilling a wellbore, during initial hydrocarbon production, or before, during or after fracking processes, or during primary, secondary, and/or tertiary recovery processes and enhanced oil recovery (EOR) operations. When provided during fracking operations, the diverter fluid can also be provided with a proppant conventionally used in fracking, such as sand, ceramic material, aluminum oxide, or other solid material or grain.

When introduced into the formation, the described diverter fluids can act as relative permeability modifiers (RPM's). As RPM's, the diverter fluids reduce the effective permeability and flow of water without significantly affecting the flow of hydrocarbons, and in some cases enhance the flow of hydrocarbons.

EXAMPLE

Example 1

Figure 4:
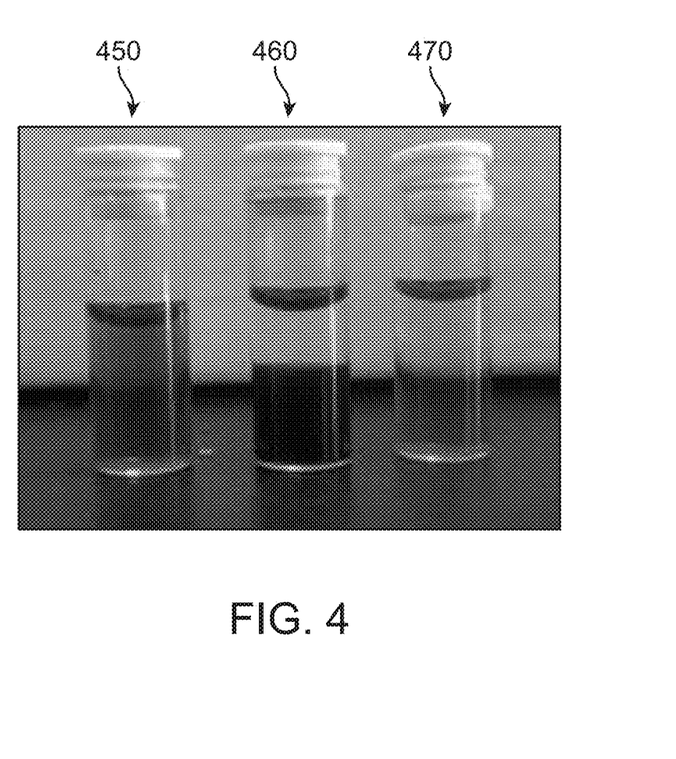
FIG. 4 is an image of a test carried out demonstrating dispersibility properties of graphene oxide and reduced graphene oxide in water.

Shown in FIG. 4 are comparative dispersibility tests which were carried out with the carbon-containing particulate graphene oxide and reduced graphene oxide. The images shown in FIG. 4 correspond to the illustrations in FIG. 1. The image 450 shown in FIG. 4 shown on the left side of FIG. 4 is graphene oxide in water. As can be seen the graphene oxide shows good polar dispersibility without having to perturb or otherwise mix the dispersion. The image shows generally an equal dispersion of the graphene oxide particles throughout the water. In the middle image 460 is shown reduced graphene oxide in water. The reduced graphene oxide therefore shows poor polar dispersibility in water due to a lowered amount of oxygen-containing substituents which renders the reduced graphene oxide hydrophobic as compared to graphene oxide. The reduced graphene oxide is shown having settled or fallen out of the water in the absence of perturbation. On the right side of FIG. 4 is shown an image 470 of a lesser amount of reduced graphene oxide in water than in the middle image 460. Even with the small amount used the reduced graphene oxide is still not able to disperse in water.

Example 2

Figure 5:
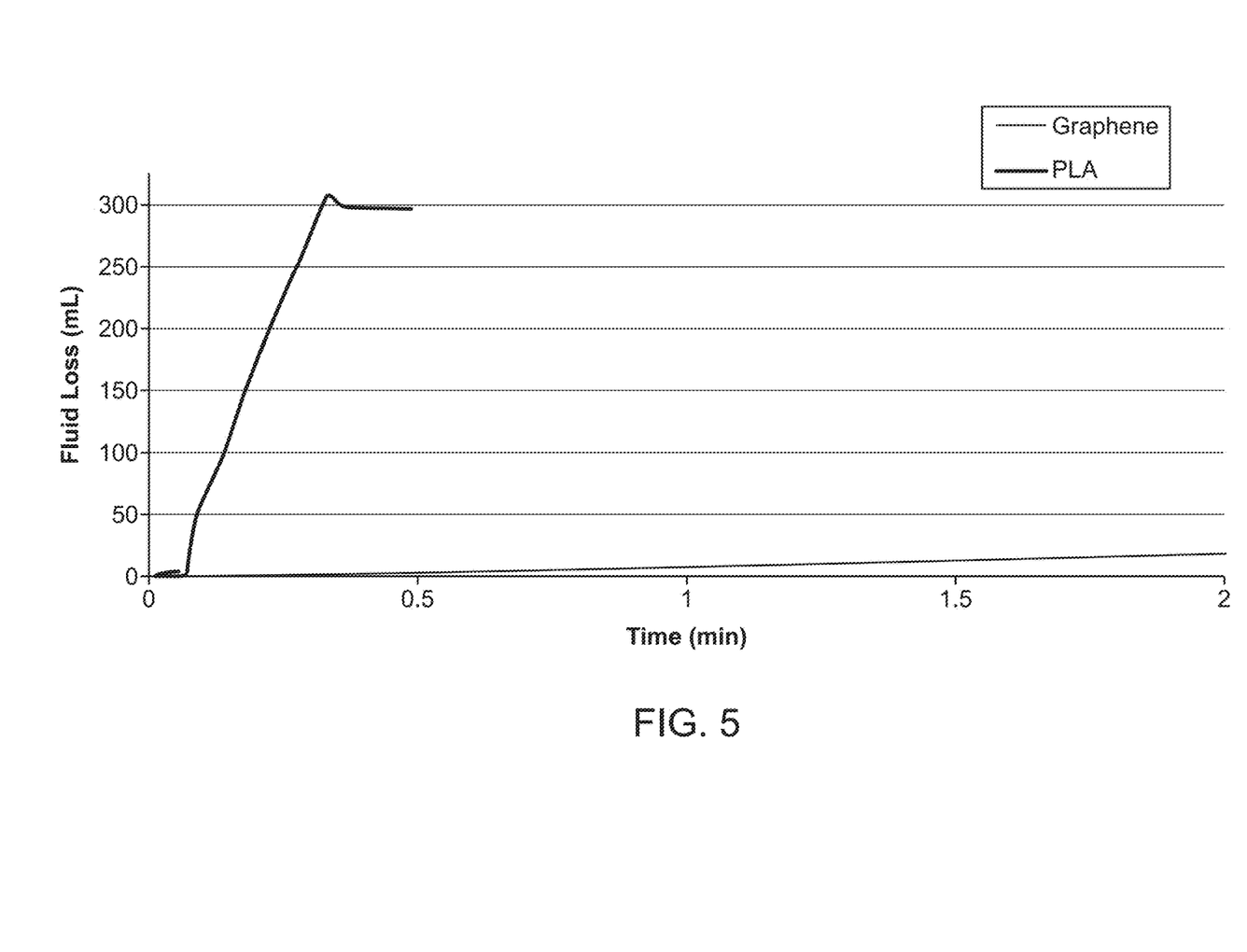
FIG. 5 is a diagram illustrating the water permeability of an exemplary dispersion having a carbon-containing particulate and compared to polylactic acid (PLA)

In this example, graphene demonstrates surprisingly superior results as compared to a conventional fluid loss agent, namely polylactic acid (PLA). To test the ability of carbon-containing particulates for use in diverter fluids, permeability studies were performed using a Permeability Plugging Apparatus (PPA) having a 3 micron Aloxite disc. FIG. 5 shows the permeability of water through polylactic acid, a common diverter fluid for water diversion, and graphene, an exemplary carbon-containing particulates for use in a diverter fluid. Experiments were performed at room temperature, using the same amount and concentration of PLA and graphene in each trial. As can be seen in FIG. 5, an 18 gram sample of PLA exhibits a fluid loss (water) of 300 mL in about 20 seconds. In comparison graphene demonstrated a fluid loss (water) of only about 0.65 mL mL in the same period of time. Therefore, surprisingly, graphene demonstrated substantially less fluid loss than the conventional fluid loss agent. Accordingly, this indicates graphene can be successfully used as a filter cake downhole. Additionally, reduced graphene oxide will have the same or similar filter properties as graphene due to having a greater C:O ratio than graphene oxide.

Example 3

Figure 6:
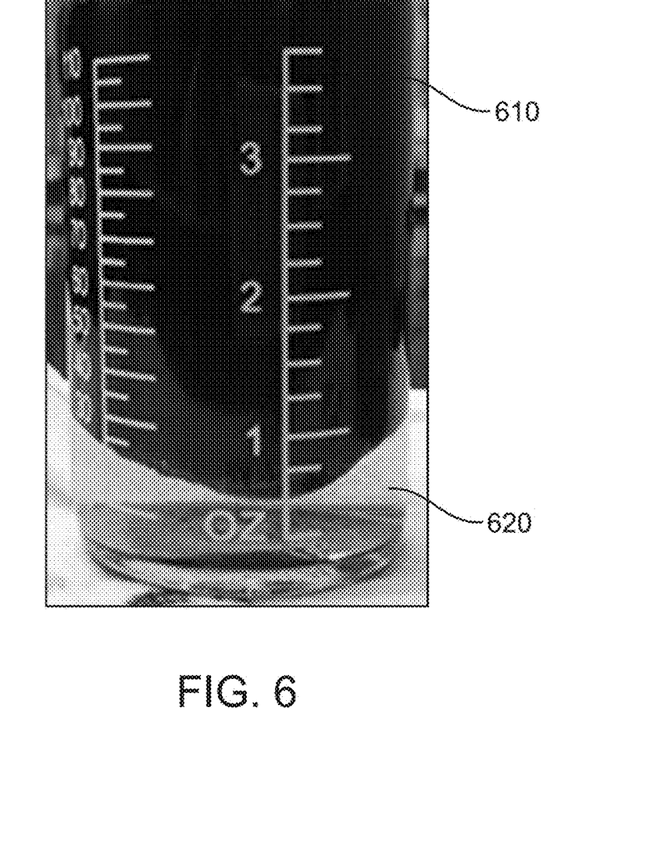
FIG. 6 is an image of a carbon containing particulate dispersed in a hydrocarbon and phase separated from water.

FIG. 6 is an image of graphene dispersed in a hydrocarbon fluid. As shown, the vial contains two distinct phases. The top phase 510 is a hydrocarbon with reduced graphene oxide dispersed therein. The bottom phase 520 is water. As shown the hydrophobic graphene is located solely within the hydrophobic hydrocarbon top phase 510 and the bottom water phase 510 is substantially free of graphene. This demonstrates graphene's tendency downhole to migrate and disperse in hydrocarbons for effective return to the surface.

As illustrated by FIGS. 4-6, hydrophilic carbon allotropes may exhibit good dispersibility in polar fluids such as water, while hydrophobic carbon allotropes do not exhibit polar dispersibility but do exhibit non-polar dispersibility. As such, under certain circumstances, one of ordinary skill may find it advantageous to prepare a dispersion containing one or more hydrophilic carbon-containing particulates, such as the non-reduced graphene oxide, in a polar or water based fluid for injection into a well bore and delivery to fractures or fracture matrices in a subterranean formation. Upon delivery of the hydrophilic carbon-containing particulates to fractures or fracture matrices in the subterranean formation, the hydrophilic carbon-containing particulates can be reduced in situ (that is, downhole, in the subterranean formation), to form reduced graphene oxide for example, using any of the reduction reactions discussed herein, to form hydrophobic carbon-containing particulates. The hydrophobic carbon-containing particulates can then adhere to the fracture formation and form a water impermeable filter cake, as discussed above, until in the presence of a hydrophobic liquid, such as hydrocarbons or oil. Upon interaction with the hydrophobic liquid, the filter cake, comprising hydrophobic carbon-containing particulates, will disperse in the hydrophobic liquid for recovery and return to the surface.

While the descriptions above describe dispersibility of the carbon-containing particulates in relation the hydrophilicity/ hydrophobicity of the carbon containing particulates and the hydrophilicity/hydrophobicity of the carrier liquid, one of ordinary skill in the art will appreciated that the carbon-containing particulate may have both hydrophilic and hydrophobic substituents thereon to varying extents depending on the synthetic procedure used to prepare the carbon-containing particulates. One of ordinary skill will further appreciate that the choice of carbon-containing particulate and carrier fluid can be made on a case-by-case basis depending on various factors such as, for example, the composition and degree of fracturing of the subterranean formation rock, the downhole conditions of the well bore (such as temperature and pressure), among other considerations.

Statements of the Disclosure Include:

Statement 1: A method comprising introducing into a wellbore a water based diverter fluid, the diverter fluid having a continuous aqueous phase and an oxygen functionalized carbon-containing particulate dispersed in the aqueous phase.

Statement 2: The method according to Statement 1, further comprising returning the oxygen functionalized carbon-containing particulate to the surface dispersed in hydrocarbons produced from the wellbore.

Statement 3: The method according to Statement 1 or Statement 2, wherein the oxygen functionalized carbon-containing particulate is graphene oxide.

Statement 4: The method according to any one of Statements 1-3, further comprising introducing into the wellbore a reducing agent whereby the oxygen functionalized carbon-containing particulate is reduced by the reducing agent.

Statement 5: The method according to Statement 4, wherein the reduced oxygen functionalized carbon-containing particulate is reduced graphene oxide.

Statement 6: The method according to any one of Statements 1-4, wherein the oxygen functionalized carbon-containing particulate is dispersed in the diverter fluid in the absence of a surfactant.

Statement 7: The method according to any one of Statements 1-4 and 6, wherein the oxygen functionalized carbon-containing particulate is made up of one or more carbon allotropes.

Statement 8: The method according to any one of Statements 1-4 and 6-7, further comprising agglomerating the carbon-containing particulate within a formation in the wellbore to form a filter cake.

Statement 9: A method comprising introducing into a wellbore a water based diverter fluid having a carbon-containing particulate suspended in the diverter fluid by a gelling agent.

Statement 10: The method according Statement 9, wherein the carbon-containing particulate is graphene or reduced graphene oxide.

Statement 11: The method according Statement 9 or Statement 10, further comprising introducing breakers into the wellbore, wherein the gelling agent is degraded by the breakers to release the carbon-containing particulate.

Statement 12: The method according to Statement 9 or Statement 10, wherein the gelling agent is degraded thereby releasing the carbon-containing particulate within the wellbore.

Statement 13: The method according to any one of Statements 9-12, further comprising returning the carbon-containing particulate to the surface dispersed in hydrocarbons produced from the wellbore.

Statement 14: The method according to any one of Statements 9-13, wherein the carbon-containing particulate is made up of one or more carbon allotropes.

Statement 15: A method comprising introducing into a wellbore a water based diverter fluid having an oxygen functionalized carbon-containing particulate, or its reduced form, dispersed in the diverter fluid; and returning the oxygen functionalized carbon-containing particulate to the surface dispersed in hydrocarbons produced from the wellbore.

Statement 16: The method according to Statement 15, wherein the oxygen carbon-containing particulate is graphene oxide and the reduced form is reduced graphene oxide.

Statement 17: The method according to Statement 15 or Statement 16, wherein the diverter fluid comprises oxygen functionalized carbon-containing particulate dispersed in the aqueous phase of the diverter fluid.

Statement 18: The method according to any one of Statements 15-17, wherein the diverter fluid comprises a reduced form of the oxygen functionalized carbon-containing particulate dispersed in the diverter fluid via a gelling agent.

Statement 19: A diverter fluid composition comprising a water based carrier fluid having a continuous aqueous phase; a graphene oxide particulate being dispersed in the continuous aqueous phase of the carrier fluid surfactant; and optionally, one or more of proppants, viscosity enhancing agents, surfactants, electrolytes organic or inorganic salts.

Statement 20: The diverter fluid composition according to Statement 19, wherein the reduced graphene oxide particulate is dispersed in the diverter fluid in the absence of a surfactant.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed:

1. A method comprising:
   introducing into a wellbore from an Earth's surface of a well site a water based diverter fluid, the diverter fluid having a continuous aqueous phase and an oxygen functionalized carbon-containing particulate dispersed in the aqueous phase;
   reducing the oxygen functionalized carbon-containing particulate;
   forming, with the reduced oxygen functionalized carbon-containing particulate, a filter cake on a formation face; and
   returning the reduced oxygen functionalized carbon-containing particulate to the surface of the well site dispersed in hydrocarbons produced from the wellbore.

2. The method of claim 1, wherein the oxygen functionalized carbon-containing particulate is graphene oxide.

3. The method of claim 1, further comprising introducing into the wellbore a reducing agent whereby, in the step of reducing, the oxygen functionalized carbon-containing particulate is reduced by the reducing agent.

4. The method of claim 3, wherein the reduced oxygen functionalized carbon-containing particulate is reduced graphene oxide.

5. The method of claim 1, wherein the oxygen functionalized carbon-containing particulate is dispersed in the continuous aqueous phase in the absence of a surfactant.

6. The method of claim 1, wherein the oxygen functionalized carbon-containing particulate is made up of one or more carbon allotropes.

7. The method of claim 1, further comprising agglomerating the reduced oxygen functionalized carbon-containing particulate within the wellbore to form the filter cake.

8. The method of claim 1 wherein the functionalized carbon-containing particulate is formed by grinding a carbon-containing material.

9. The method of claim 1 wherein the functionalized carbon-containing particulate is particulate other than nanotubes.

* * * * *